(12) United States Patent
Raghavan et al.

(10) Patent No.: US 11,125,360 B2
(45) Date of Patent: Sep. 21, 2021

(54) MECHANICAL PROCESSING OF HIGH ASPECT RATIO METALLIC TUBING AND RELATED TECHNOLOGY

(71) Applicant: OMAX Corporation, Kent, WA (US)

(72) Inventors: Chidambaram Raghavan, Seattle, WA (US); Darren Stang, Covington, WA (US); Erik Unangst, Kent, WA (US)

(73) Assignee: OMAX Corporation, Kent, WA (US)

( * ) Notice: Subject to any disclaimer, the term of this patent is extended or adjusted under 35 U.S.C. 154(b) by 495 days.

(21) Appl. No.: 15/974,616

(22) Filed: May 8, 2018

(65) Prior Publication Data

US 2018/0320802 A1 Nov. 8, 2018

Related U.S. Application Data

(60) Continuation of application No. 15/462,733, filed on Mar. 17, 2017, now Pat. No. 9,976,675, which is a
(Continued)

(51) Int. Cl.
*C21D 9/14* (2006.01)
*B21D 41/02* (2006.01)
(Continued)

(52) U.S. Cl.
CPC .............. *F16L 9/02* (2013.01); *B21D 41/026* (2013.01); *C21D 9/14* (2013.01); *B26F 3/004* (2013.01); *C21D 9/08* (2013.01); *C21D 2261/00* (2013.01)

(58) Field of Classification Search
CPC ...... B21D 26/043; B21D 31/04; B21D 39/08; B21D 39/20; B21D 39/203; B21D 39/206;
(Continued)

(56) References Cited

U.S. PATENT DOCUMENTS 1,847,147 A 4/1930 Thomas, Jr.
2,343,890 A 3/1944 Dewald
(Continued)

FOREIGN PATENT DOCUMENTS

CN 202861228 U 4/2013
CN 202955386 U 5/2013
(Continued)

OTHER PUBLICATIONS

Hu et al., Computer Modeling and Optimization of Swage Autofrettage Process of a Thick-Walled Cylinder Incorporating Bauschinger Effect, Jan. 14, 2014, American Transactions on Engineering & Applied Sciences, vol. 3, pp. 31-63. Retrieved from [https://tuengr.com/ATEAS/V03/0031.pdf] (Year: 2014).*
(Continued)

*Primary Examiner* — Adam J Eiseman
*Assistant Examiner* — Stephen Floyd London
(74) *Attorney, Agent, or Firm* — Perkins Coie LLP

(57) ABSTRACT

Tubes for use in ultrahigh pressure devices, and associated systems and methods of manufacture are disclosed herein. In one embodiment, a metal tube includes an elongate bore having a circular transverse cross-sectional shape. The metal tube also includes an elongate wall extending around the bore and having an annular transverse cross-sectional shape with an inner surface closest to the bore, an outer surface furthest from the bore, and a wall thickness extending from
(Continued)

the inner surface to the outer surface. An inner portion of the wall is under swage-autofrettage-induced overall compressive stress.

24 Claims, 11 Drawing Sheets

Related U.S. Application Data division of application No. 14/924,591, filed on Oct. 27, 2015, now Pat. No. 9,638,357, which is a division of application No. 14/749,500, filed on Jun. 24, 2015, now abandoned.

(51) Int. Cl.
  *C21D 9/08* (2006.01)
  *F16L 9/02* (2006.01)
  *B26F 3/00* (2006.01)

(58) Field of Classification Search
  CPC .... B21D 41/02; B21D 41/025; B21D 41/026; B21D 41/028; B21D 41/021; F16L 9/02
  USPC ... 72/367.1, 370.01, 370.06, 370.08, 370.14, 72/370.24, 370.25
  See application file for complete search history.

(56) References Cited

U.S. PATENT DOCUMENTS

| | | | |
|---|---|---|---|
| 2,528,280 A | 10/1950 | Lyon | |
| 2,715,958 A * | 8/1955 | Lindstrom | B21B 25/06 198/867.15 |
| 2,788,994 A | 4/1957 | Van de Wateren | |
| 2,999,552 A | 9/1961 | Fox | |
| 3,232,638 A | 2/1966 | Hollander | |
| 3,267,718 A * | 8/1966 | Grube | B21B 25/06 72/422 |
| 3,303,859 A | 2/1967 | Ackermann et al. | |
| 3,382,565 A | 5/1968 | Binkley | |
| 3,517,701 A | 6/1970 | Smith | |
| 3,574,917 A | 4/1971 | Miyazaki | |
| 3,668,916 A | 6/1972 | Ledebur | |
| 3,711,633 A | 1/1973 | Ghirardi et al. | |
| 3,718,017 A | 2/1973 | Blackburn | |
| 3,915,291 A | 10/1975 | Vogts | |
| 4,065,953 A | 1/1978 | Frentzen et al. | |
| 4,089,199 A * | 5/1978 | Siemonsen | B21C 37/16 72/283 |
| 4,090,382 A | 5/1978 | Schott | |
| 4,134,430 A | 1/1979 | Mukasa | |
| 4,186,584 A | 2/1980 | Schott | |
| 4,195,669 A | 4/1980 | Ives | |
| 4,261,769 A | 4/1981 | Usui | |
| 4,270,379 A | 6/1981 | Van Gompel | |
| 4,339,897 A | 7/1982 | Thompson et al. | |
| 4,926,667 A | 5/1990 | Markiewicz et al. | |
| 5,040,396 A | 8/1991 | Mikhail et al. | |
| 5,040,405 A | 8/1991 | Honma et al. | |
| 5,099,677 A | 3/1992 | Tokura | |
| 5,160,802 A | 11/1992 | Moscrip | |
| 5,255,853 A | 10/1993 | Munoz | |
| 2,728,373 A | 12/1995 | Zimpel | |
| 5,472,367 A | 12/1995 | Slocum et al. | |
| 5,508,596 A | 4/1996 | Olsen | |
| 5,564,184 A | 10/1996 | Dinh | |
| 5,685,190 A | 11/1997 | Yamamoto et al. | |
| 5,752,313 A | 5/1998 | Gaffaney et al. | |
| 5,794,858 A | 8/1998 | Munoz | |
| 5,837,921 A | 11/1998 | Rinaldi | |
| 5,856,631 A | 1/1999 | Julien | |
| 5,892,345 A | 4/1999 | Olsen | |
| 5,916,321 A | 6/1999 | Holmes | |
| 5,948,332 A * | 9/1999 | Prenger | B29C 55/26 264/40.5 |
| 6,155,092 A * | 12/2000 | Sahlem | B21C 23/085 72/260 |
| 6,163,955 A | 12/2000 | Tsai | |
| 6,279,363 B1 | 8/2001 | Averbuch | |
| 6,354,126 B1 | 3/2002 | Small et al. | |
| 6,408,826 B2 | 6/2002 | Asada | |
| 6,619,099 B2 | 9/2003 | Barjesteh | |
| 6,810,615 B2 | 11/2004 | Hermanson et al. | |
| 6,922,605 B1 | 7/2005 | Olsen | |
| 6,931,776 B2 | 8/2005 | Wagner et al. | |
| 6,932,285 B1 | 8/2005 | Zeng | |
| 7,035,708 B1 | 4/2006 | Olsen | |
| 7,074,112 B2 | 7/2006 | Olsen | |
| 7,225,660 B1 | 6/2007 | Ledebur | |
| 7,815,490 B2 | 10/2010 | Liu | |
| 7,818,986 B1 | 10/2010 | Parker et al. | |
| 7,946,147 B2 | 5/2011 | Shimai et al. | |
| 8,123,591 B2 | 2/2012 | Olsen | |
| 8,276,261 B2 | 10/2012 | Baba | |
| 8,475,230 B2 | 7/2013 | Summers et al. | |
| 8,479,549 B1 | 7/2013 | Fonte | |
| 8,593,086 B2 | 11/2013 | Hay et al. | |
| 8,821,213 B2 | 9/2014 | Liu et al. | |
| 8,892,236 B2 | 11/2014 | Olsen | |
| 8,904,912 B2 | 12/2014 | Raghavan et al. | |
| 8,910,409 B1 | 12/2014 | Fonte | |
| 8,920,213 B2 | 12/2014 | Liu | |
| 8,984,926 B2 | 3/2015 | Davidsen | |
| 9,003,955 B1 | 4/2015 | Stang et al. | |
| 9,011,204 B2 | 4/2015 | Raghavan et al. | |
| 9,044,873 B2 | 6/2015 | Guglielmetti et al. | |
| 9,050,704 B1 | 6/2015 | Liu et al. | |
| 9,067,331 B2 | 6/2015 | Stang | |
| 9,090,808 B1 | 7/2015 | Liu et al. | |
| 9,095,955 B2 | 8/2015 | Raghavan et al. | |
| 9,108,297 B2 | 8/2015 | Schubert et al. | |
| 9,138,863 B2 | 9/2015 | Schubert et al. | |
| 9,272,437 B2 | 3/2016 | Hashish et al. | |
| 9,273,682 B2 | 3/2016 | Stang | |
| 9,283,656 B2 | 3/2016 | Schubert et al. | |
| 9,375,771 B2 | 6/2016 | Fonte | |
| 9,492,908 B2 | 11/2016 | Schubert et al. | |
| 9,574,684 B1 | 2/2017 | Fonte | |
| 9,586,306 B2 | 3/2017 | Zhang et al. | |
| 9,610,674 B2 | 4/2017 | Raghavan et al. | |
| 9,636,799 B2 | 5/2017 | Liu et al. | |
| 9,638,357 B1 | 5/2017 | Raghavan et al. | |
| 9,649,744 B2 | 5/2017 | Raghavan et al. | |
| 9,658,613 B2 | 5/2017 | Henning et al. | |
| 9,720,399 B2 | 8/2017 | Henning et al. | |
| 9,727,051 B2 | 8/2017 | Henning et al. | |
| 9,772,620 B2 | 9/2017 | Henning et al. | |
| 9,810,205 B2 | 11/2017 | Raghavan et al. | |
| 9,827,649 B2 | 11/2017 | Schubert et al. | |
| 9,884,406 B2 | 2/2018 | Hashish et al. | |
| 9,891,617 B2 | 2/2018 | Henning et al. | |
| 9,976,675 B1 | 5/2018 | Raghavan et al. | |
| 9,989,954 B2 | 6/2018 | Henning et al. | |
| 10,010,999 B2 | 7/2018 | Raghavan et al. | |
| 10,048,676 B2 | 8/2018 | Henning et al. | |
| 10,146,209 B2 | 12/2018 | Henning et al. | |
| 10,564,627 B2 | 2/2020 | Henning et al. | |
| 10,606,240 B2 | 3/2020 | Henning et al. | |
| 10,642,252 B2 | 5/2020 | Henning et al. | |
| 10,656,622 B2 | 5/2020 | Henning et al. | |
| 10,675,733 B2 | 6/2020 | Zhang et al. | |
| 10,780,551 B2 | 9/2020 | Zhang et al. | |
| 10,801,651 B2 | 10/2020 | Olsen et al. | |
| 10,808,688 B1 | 10/2020 | Raghavan et al. | |
| 10,983,503 B2 | 4/2021 | Henning et al. | |
| 10,990,080 B2 | 4/2021 | Henning et al. | |
| 2003/0067168 A1 | 4/2003 | Sches | |
| 2003/0141617 A1* | 7/2003 | Prevotat | B29C 48/905 264/40.7 |
| 2004/0198179 A1 | 10/2004 | Gadd | |
| 2005/0017091 A1 | 1/2005 | Olsen et al. | |
| 2005/0098963 A1 | 5/2005 | Olsen | |

(56) References Cited

U.S. PATENT DOCUMENTS

| | | | |
|---|---|---|---|
| 2007/0186604 A1* | 8/2007 | Koppensteiner | B21J 13/00 72/97 |
| 2007/0203858 A1 | 8/2007 | Olsen | |
| 2008/0110229 A1 | 5/2008 | Badlani | |
| 2009/0139595 A1 | 6/2009 | Kato | |
| 2009/0151701 A1 | 6/2009 | Kato | |
| 2010/0064870 A1 | 3/2010 | Olsen | |
| 2010/0199740 A1* | 8/2010 | Muschalik | B21J 13/08 72/370.25 |
| 2010/0230953 A1 | 9/2010 | Baylot et al. | |
| 2010/0257913 A1 | 10/2010 | Storm, Jr. et al. | |
| 2010/0326271 A1 | 12/2010 | Stang | |
| 2011/0005067 A1 | 1/2011 | McDaniel et al. | |
| 2011/0011253 A1 | 1/2011 | Fonte | |
| 2011/0084476 A1 | 4/2011 | Nishida | |
| 2011/0232355 A1* | 9/2011 | Evans | B21D 41/02 72/367.1 |
| 2011/0297269 A1* | 12/2011 | Pilon | B32B 15/01 138/141 |
| 2012/0247296 A1 | 10/2012 | Stang et al. | |
| 2014/0015245 A1 | 1/2014 | Chiu | |
| 2014/0124184 A1* | 5/2014 | Tokura | B21D 53/08 165/181 |
| 2014/0273768 A1 | 9/2014 | Guglielmetti et al. | |
| 2014/0377485 A1 | 12/2014 | Berger | |
| 2015/0082606 A1* | 3/2015 | Nakajima | G21D 1/006 29/523 |
| 2017/0297168 A1 | 10/2017 | Raghavan et al. | |
| 2018/0161958 A1 | 6/2018 | Schubert et al. | |
| 2018/0364679 A1 | 12/2018 | Henning et al. | |
| 2019/0101894 A1 | 4/2019 | Henning et al. | |
| 2020/0007254 A1 | 1/2020 | Hay et al. | |

FOREIGN PATENT DOCUMENTS

| | | |
|---|---|---|
| DE | 4343820 A1 | 6/1995 |
| JP | 2003088924 A | 3/2003 |
| JP | 2013086122 A | 5/2013 |

OTHER PUBLICATIONS

American Rifleman, Ruger New Model Single-Six .17 HMR, Sep. 2003, pp. 90-96. (Year: 2003).*

Davidson et al., "Residual Stresses in Thick-walled Cylinders Resulting from Mechanically Induced Overstrain," Experimental Mechanics, Nov. 1963, pp. 253-262.

Gibson et al., "Investigation of Residual Stress Development During Swage Autofrettage, Using Finite Element Analysis," Proceedings of the ASME 2009 International Mechanical Engineering Congress & Exposition, Nov. 13-19, 2009, 8 pages.

Gibson, Michael C., "Determination of Residual Stress Distributions in Autofrettaged Thick-Walled Cylinders," Department of Engineering Systems and Management Defense College of Management and Technology, Cranfield University, Apr. 2008, 302 pages.

O'Hara, Peter G., "Analysis of the Swage Autofrettage Process," Technical Report ARCCB-TR-92016, U.S. Army Armament Research, Development and Engineering Center, Close Combat Armaments Center, Benet Laboratories, Watervliet, N.Y., Apr. 1992, 22 pages.

Perl et al., "Is There an "Ultimate" Autofrettage Process?," Journal of Pressure Vessel Technology, vol. 134, Aug. 2012, 5 pages.

* cited by examiner

MECHANICAL PROCESSING OF HIGH ASPECT RATIO METALLIC TUBING AND RELATED TECHNOLOGY

CROSS-REFERENCE TO RELATED APPLICATIONS INCORPORATED BY REFERENCE

The present application is a continuation of U.S. application Ser. No. 15/462,733 filed Mar. 17, 2017, now U.S. Pat. No. 9,976,675, which is a divisional of U.S. application Ser. No. 14/924,591 filed Oct. 27, 2015, now U.S. Pat. No. 9,638,357, which is a divisional of U.S. application Ser. No. 14/749,500, filed Jun. 24, 2015, and titled MECHANICAL PROCESSING OF HIGH ASPECT RATIO METALLIC TUBING AND RELATED TECHNOLOGY, all of which are incorporated herein by reference in their entirety. To the extent the foregoing applications or any other material incorporated herein by reference conflicts with the present disclosure, the present disclosure controls.

TECHNICAL FIELD

The present disclosure is directed generally to thick-walled tubing for containing and conveying ultrahigh pressure liquid, systems that include such tubing, and methods of manufacturing such tubing.

BACKGROUND

A variety of devices utilize ultrahigh pressure tubing, fittings, and/or other components that must withstand extreme pressures. In waterjet systems, for example, liquid is often contained and directed through tubes at ultrahigh pressures (i.e., pressures in excess of 30,000 psi). At pressures of this magnitude, high stresses are developed within the tubes. Repeated application of these pressures can lead to metal fatigue and eventual mechanical failure of the tubes. For example, repeated pressurization cycles in a waterjet system can eventually initiate cracks at an inner wall of a tube along a plane of highest shear stress. This is known as stage I of the fatigue crack propagation process. The repeated pressurization cycles can subsequently propagate the cracks from the inner wall towards an outer wall of the tube perpendicular to the maximum applied alternating loads. This is known as stage II of fatigue crack propagation. As the pressurization cycles continue the crack can grow until the stress intensity at the crack tip reaches the fracture toughness of the material and the crack grows in an unstable fashion until through-wall failure takes place. This is known as stage III of the fatigue crack propagation process. Tubing that is not regularly inspected and replaced to avoid failure due to the repeated application of internal pressure loading can eventually suffer fatigue failure. However, frequent inspection and replacement of tubes in waterjet systems is expensive.

Currently, waterjet systems typically make use of stainless steel tubing having nominal outer diameters of ¼", ⅜", or 9/16" and nominal inside diameters equal to approximately ⅓ of the outer diameter. These ultrahigh pressure (UHP) stainless steel tubes typically have long lengths, and thereby have high aspect ratios (ratio of length to inside diameter). By virtue of their material and dimensions, UHP tubes can undergo numerous pressurization cycles before succumbing to fatigue failure. Typical stainless steel UHP tubes used in waterjet systems, for example, have operational lifespans of approximately 30,000 pressurization cycles from atmospheric pressure to 60,000 psi.

In addition to selecting appropriate materials and dimensions for tubing used to contain and convey UHP liquid, certain manufacturing techniques can be used to increase the operational lifespan of the tubing. For example, beneficial residual stresses can be induced within sections of tubing to increase the resistance to fatigue failure. In one method of inducing beneficial residual stresses, tubes are subjected to a procedure known as hydraulic autofrettage. This process involves the containment of a fluid within a tube and pressurization of the fluid to a pressure sufficient to produce a desired plastic deformation within an inner portion of a wall of the tube. The plastic deformation produces a slight increase in an inside diameter of the tube, and creates residual stresses in the wall of the tube.

Although the entire wall thickness is under hydraulic autofrettage induced stresses, the innermost portion of the wall thickness is under the greatest amount of induced beneficial compressive stress. The residual compressive stresses produced by the plastic deformation include radial and tangential stresses, the latter of which can be particularly beneficial. The compressive stresses are at a maximum at the inside diameter of the tube, and by reducing or minimizing the maximum shear stress from pressure cycles the compressive stresses can delay crack initiation and slow the growth of cracks. The benefit of hydraulic autofrettage and the penetration depth of compressive stresses is dependent on the wall ratio of the tube (ratio of outside diameter to inside diameter), the tubing material strength, and the autofrettage pressure.

In addition to delayed stage I crack initiation, hydraulic autofrettage can also slow stage II fatigue crack propagation by reducing the maximum principal stresses incurred during pressure cycles. Accordingly, by reducing the detrimental effects of pressurization cycles, hydraulic autofrettage can increase the fatigue life of the tubing and increase the maximum allowable internal pressure a tube can withstand.

In the context of waterjet systems, hydraulic autofrettage can extend the mean operational lifespan of tubing by 40 to 50%. For example, rather than 30,000 pressurization cycles from atmospheric pressure to 60,000 psi, a waterjet system utilizing tubing that has undergone hydraulic autofrettage can often perform up to 45,000 of these pressurization cycles. Although this increase in the operational lifespan of tubing is beneficial, additional increases in the operational lifespan of tubing are desirable to provide additional decreases in maintenance and operational costs of waterjet systems.

DETAILED DESCRIPTION

Figure 1A:
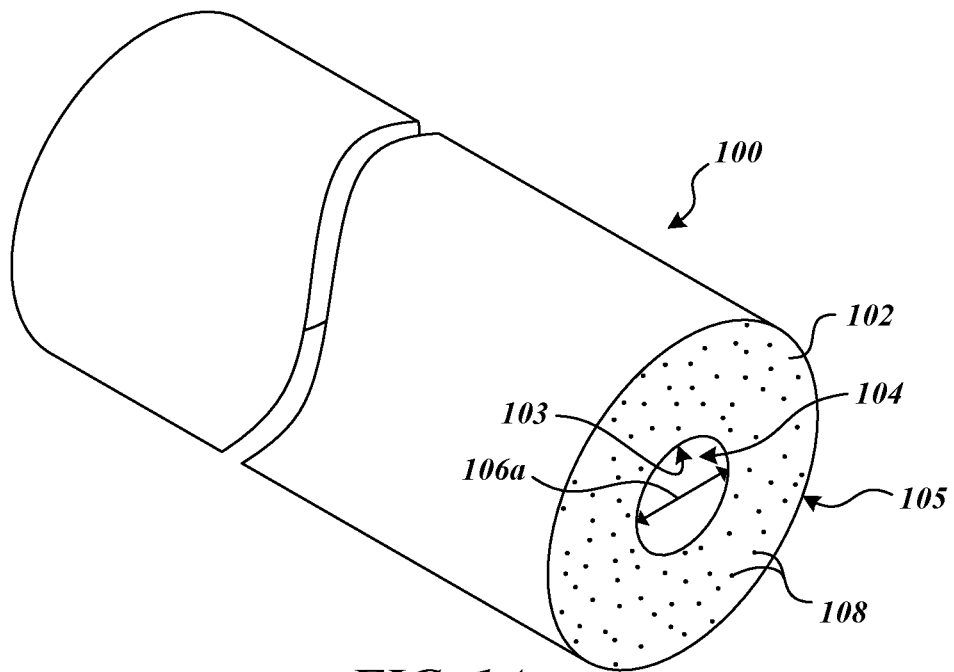
FIG. 1A is a partially schematic, isometric and cross-sectional view of a prior art tube prior to undergoing hydraulic autofrettage.

The present technology is directed generally to components for use in ultrahigh pressure devices, and more specifically to systems and methods for mechanical swage autofrettage and the components produced by such systems and methods. At least some embodiments of the present technology include a metal thick-walled tube having an elongate bore and a circular transverse cross-sectional shape. The metal tube includes an elongate wall extending around the bore and having an annular transverse cross-sectional shape with an inner surface closest to the bore, an outer surface furthest from the bore, and a wall thickness extending from the inner surface to the outer surface. An inner portion of the wall is under swage-autofrettage-induced overall compressive stress. In other embodiments, the devices, systems and associated methods can have different configurations, components, and/or procedures. Still other embodiments may eliminate particular components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1-9.

Certain details are set forth in the following description and FIGS. 1-9 to provide a thorough understanding of various embodiments of the disclosure. Other details describing well-known structures and systems often associated with high-pressure tubes and the components or devices associated with the manufacturing of high-pressure tubes, however, are not set forth below to avoid unnecessarily obscuring the description of the various embodiments of the disclosure. Moreover, although several embodiments disclosed herein are primarily or entirely directed to waterjet applications, other applications in addition to those disclosed herein are within the scope of the present technology. Furthermore, waterjet components or systems configured in accordance with embodiments of the present technology can be used with a variety of suitable fluids, such as water, aqueous solutions, hydrocarbons, glycol, and liquid nitrogen, among others. As such, although the term "waterjet" is used herein for ease of reference, unless the context clearly indicates otherwise, the term refers to a jet formed by any suitable fluid, and is not limited exclusively to water or aqueous solutions. Additionally, the term "waterjet" can refer to a jet that includes abrasive particles, e.g., an abrasive waterjet.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

As discussed above, hydraulic autofrettage can produce relatively significant residual compressive stresses within the inner wall of the tubes and can increase the fatigue life of these components when they are subsequently subjected to pressure cycles. In addition, the hydraulic autofrettage process can increase the maximum allowable internal pressure a tube can withstand before additional yielding begins to occur. As an alternative to hydraulic autofrettage, mechanical or swage autofrettage can be used to increase the fatigue life and/or the elastic pressure rating of components subjected to high pressures. For example, swage autofrettage may be used to improve the fatigue life of large caliber artillery gun barrels. During swage autofrettage of a barrel, a mandrel having a diameter slightly larger than the barrel's bore can be directed through the bore. The passage of the mandrel enlarges the bore, producing plastic deformation in the metal adjacent to the bore. Similar to hydraulic autofrettage, the plastic deformation from swage autofrettage creates high compressive stresses at the innermost section of the barrel that can inhibit fatigue crack nucleation and slow crack growth by reducing or minimizing the maximum shear stress developed during subsequent pressure cycles. The compressive stresses reduce the detrimental effects of pressurization cycles and increase the fatigue life of the barrel. Similar to the hydraulic autofrettage process, the swage autofrettage process can also increase the maximum allowable internal pressure the barrel can withstand (elastic strength) before additional yielding begins to occur subsequent to the process. For both the hydraulic autofrettage process and the swage autofrettage process, residual stresses must resolve themselves within the part so that equilibrium conditions are satisfied.

Importantly, compared to hydraulically autofrettaged tubes, the magnitude of compressive stresses can be greater in swage autofrettaged tubes. Additionally, the swaging process can induce axial compressive stresses when the mandrel is progressed through the tube. The benefit of swage autofrettage can be dependent on the wall ratio of the tube, the material, and the mandrel shape & diameter. Importantly, the fatigue life of swage autofrettaged components can be far greater than hydraulically autofrettaged components for a given overstrain.

Swage autofrettage, while advantageous for the reasons stated above, has not been recognized as an option for autofrettage of high aspect ratio tubes (tubes having a high ratio of length to inside diameter). For example, swage autofrettage in the context of gun barrels and other low aspect ratio tubes requires the use of pushrods or pull-rods to force mandrels through the barrels. When performing swage autofrettage on high aspect ratio tubing using conventional techniques, the pushrods or pull-rods would be susceptible to bending, buckling or breakage, which would interrupt the autofrettage process and/or damage the components being subjected to the process. Breakage of pushrods or pullrods can require expensive repairs or replacement. In view of these complications, swage autofrettage is not conventionally used on high aspect ratio tubes, such as those used in waterjet systems. In contrast, hydraulic autofrettage does not require a pushrod or a pullrod, and it can generally be employed on much longer components than swage autofrettage. Even so, hydraulic autofrettage can be slow, complex, expensive and dangerous.

Although counterintuitive for use on the high aspect ratio tubing used in waterjet systems, the inventors have discovered methods to reliably conduct swage autofrettage on such tubes. Moreover, the inventors have discovered systems and methods that reduce or eliminate at least some of the challenges conventionally thought to make the swage autofrettage process unsuitable for the production of tubing for waterjet systems. These and other features of at least some embodiments of the present disclosure are described below.

Figure 1B:
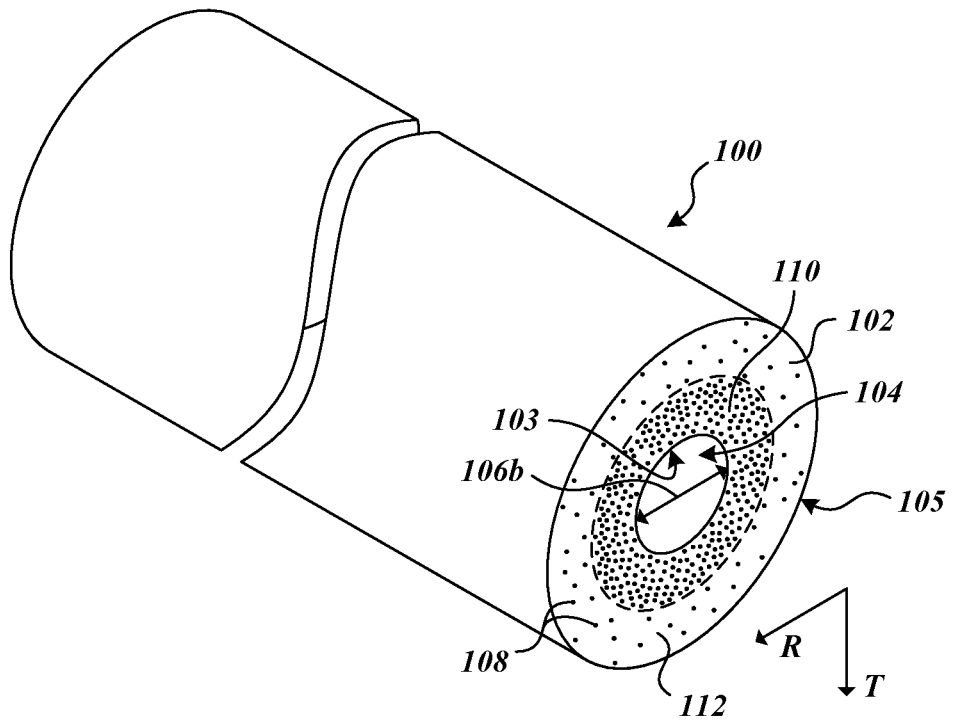
FIG. 1B is a partially schematic, isometric and cross-sectional view of the prior art tube of FIG. 1A, subsequent to undergoing hydraulic autofrettage.

FIG. 1A is a partially schematic, isometric and cross-sectional view of a prior art tube 100 prior to undergoing hydraulic autofrettage. The tube 100 has a circular transverse cross-sectional shape and includes an elongate cylindrical wall 102 defining a longitudinal bore 104 and having a first inside diameter 106a. The wall 102 has an annular transverse cross-sectional shape and extends from an inner surface 103 to an outer surface 105. The wall 102 is formed from a metal or metal alloy, typically an austenitic stainless steel, containing a plurality of relatively evenly distributed crystalline grains intermixed with precipitates 108 within the wall 102. FIG. 1B is a partially schematic, isometric and cross-sectional view of the prior art tube 100 subsequent to undergoing hydraulic autofrettage. When performing hydraulic autofrettage, the entire length of the tube being processed is subjected to internal pressure. Comparing FIG. 1B to FIG. 1A, the hydraulic autofrettage process has enlarged the bore 104 via hydraulic autofrettage compression of the wall 102 in a first portion 110 that is adjacent to the bore 104. Specifically, the compression of the wall 102 produces a second inside diameter 106b that is larger than the first inside diameter 106a. Hence, after the hydraulic autofrettage, the bore 104 has a greater transverse cross-sectional area.

The compression of the wall 102 produces compressive stresses within the first portion 110. The compressive stresses include stresses in a radial direction R and in a tangential direction T. A second portion 112 of the wall 102 further from the inner surface 103 than the first portion 110 is in a state of residual tangential tension and a small degree of radial compression; and the radial stresses at the bore and outside diameter are zero. The extent of the compression of the wall that produces the compressed first portion 110 is dependent upon the material strength of the tube 100, the wall ratio of the tube 100 (ratio of outside diameter to inside diameter), and the hydraulic pressure that is exerted on a fluid within the bore during the hydraulic autofrettage process. The greater the pressure, the greater the extent of the compressed first portion 110. Notably, in the context of hydraulic autofrettage, over-pressurization can potentially result in a rupture of the tube 100. Accordingly, the pressure is carefully managed during hydraulic autofrettage such that the maximum tangential compressive stresses are attained in the first portion 110 of the wall 102 along a radial line from the inner surface 103 to the side surface or outer surface 105.

Figure 2A:
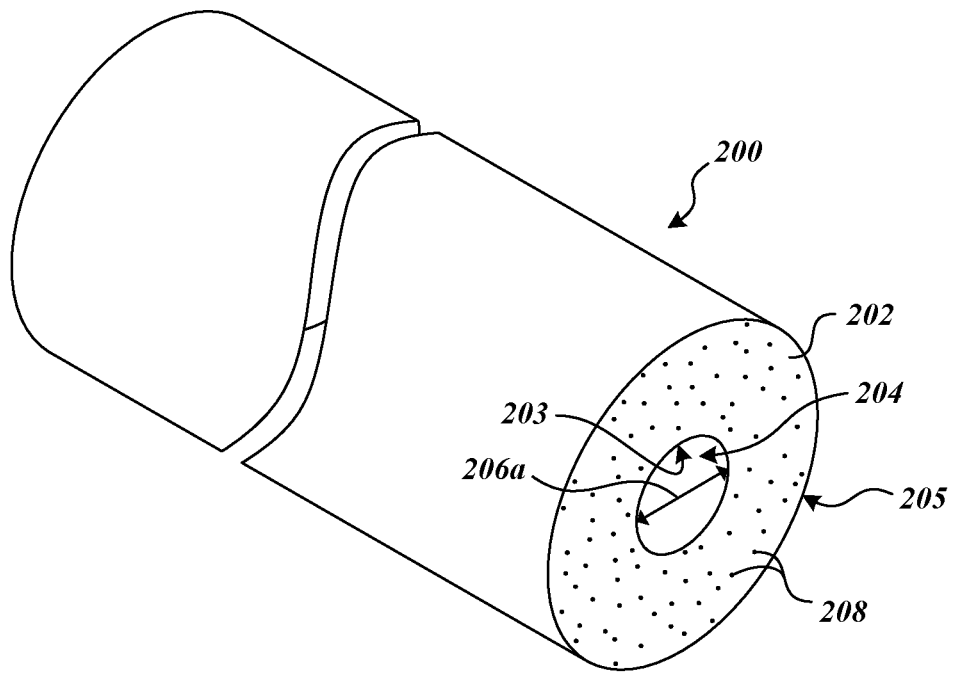
FIG. 2A is a partially schematic, isometric and cross-sectional view of a tube prior to undergoing swage autofrettage in accordance with an embodiment of the present disclosure.

FIG. 2A is a partially schematic, isometric and cross-sectional view of a tube 200 prior to undergoing swage autofrettage in accordance with an embodiment of the present disclosure. In the illustrated embodiment, the tube 200 has a circular transverse cross-sectional shape and includes an elongate cylindrical wall 202 having an inner surface 203 and a side surface or outer surface 205. The wall 202 has an annular transverse cross-sectional shape and defines a longitudinal bore 204 having an initial or first inside diameter 206a. Similar to the tube 100, the wall 202 is formed from a metal or metal alloy, most typically an austenitic stainless steel containing a plurality of relatively evenly distributed crystalline grains intermixed with precipitates 208 within the wall 202. The cross-sectional view of FIG. 2A illustrates only a portion of the entire length of the tube 200, and may not be drawn to scale. Accordingly, it is to be understood that the tube 200 can have a significant length, as well as a variety of inside and outside diameters. In at least some embodiments, the tube 200 has an aspect ratio (ratio of length to inside diameter) of 90 or more and includes a bore having a diameter of less than 0.25 inches. For example, the tube can have an inner diameter of 0.2 inches and a length greater than three feet. In other embodiments, the aspect ratio can be less than 90 and the inside diameter can be greater than 0.25 inches. Furthermore, in at least some embodiments, the wall ratio (i.e., the ratio of the outside diameter to the inside diameter) is between 2 and 5.

Figure 2B:
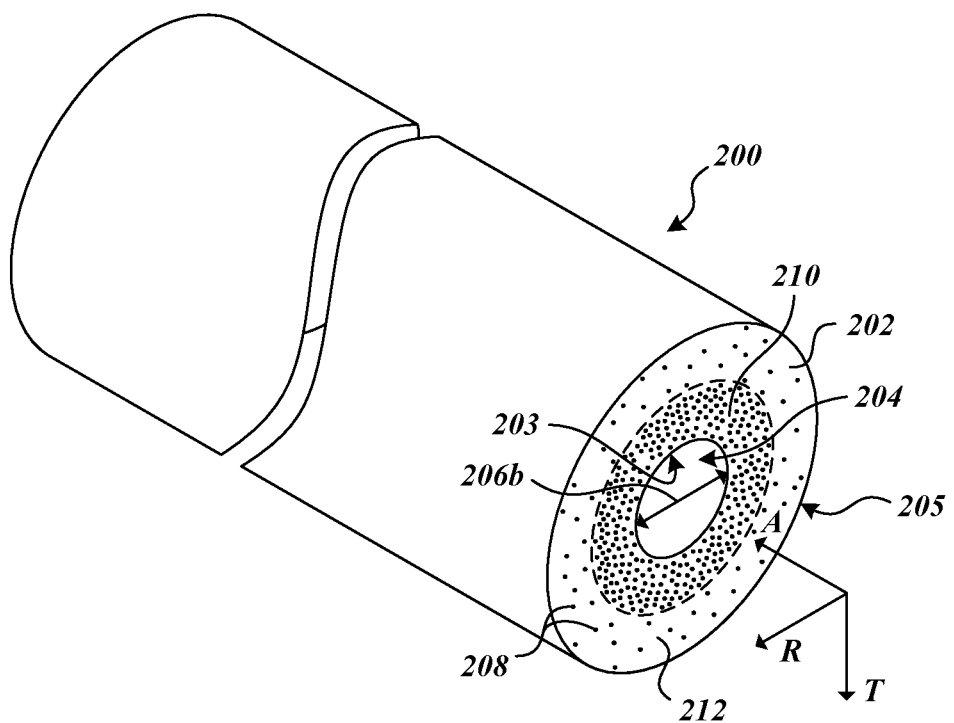
FIG. 2B is a partially schematic, isometric and cross-sectional view of the tube of FIG. 2A, subsequent to undergoing swage autofrettage in accordance with an embodiment of the disclosure.

FIG. 2B is a partially schematic, isometric and cross-sectional view of the high aspect ratio tube 200 subsequent to undergoing swage autofrettage in accordance with an embodiment of the disclosure. Comparing FIG. 2B to FIG. 2A, the swage autofrettage has enlarged the bore 204 via compression of the wall 202 in a first portion 210 that is adjacent to the bore 204. Similar to the hydraulic autofrettage process discussed above, the compression of the wall 202 produces a subsequent or second inside diameter 206b that is larger than the first inside diameter 206a, and the swage autofrettage thereby increases the transverse cross-sectional area of the bore 204. Notably, however, the compression of the wall 202 via swage autofrettage produces greater compressive stresses within the wall 202 than the compressive stresses produced in the wall 102 via the hydraulic autofrettage of the tube 100. In particular, given the same degree of overstrain as hydraulic autofrettage, the swage autofrettaged tube 200 illustrated in FIG. 2B exhibits greater overall compressive stresses within the first portion 210 of the wall 202. Additionally, in the case of swage autofrettage, the overstrain creates the residual stresses within the tube as the mandrel passes through the bore as opposed to the entire tube being subjected to the internal pressure and overstrain when the pressure is applied via hydraulic autofrettage.

The compression of the wall 202 produces compressive stresses within the first portion 210 in a radial direction R and a tangential direction T. In contrast to the hydraulic autofrettage described above, the swage autofrettage also produces compressive stresses in the first portion 210 in an axial direction A. A second portion 212 of the wall 202 further from the inner surface 203 than the first portion 210 is in a state of residual tangential and axial tension and a small degree of radial compression; and the radial stresses at the bore and outside diameter are at zero.

Without being bound by any theory or mechanism, it is believed that swage autofrettage produces compressive stresses in the axial direction via displacement and/or dislocation of the metal microstructures 208 in the axial direction. These additional compressive stresses provide further elastic strengthening of the tube 200. Utilizing the systems and methods disclosed herein, the inventors have produced UHP stainless steel tubes that can withstand 175,000 pressurization cycles of atmospheric pressure to 60,000 psi. The baseline fatigue data for unprocessed tubing of the same material is 30,000 cycles, and hydraulically autofrettaged tubing fatigue life is 42,600 pressure cycles. Therefore, the swage autofrettage process disclosed herein surprisingly provides a fatigue life that is 480% greater than that of an unprocessed tube, and 310% greater than that of a hydraulically autofrettaged tube.

Embodiments configured in accordance with the present technology can include tubes and mandrels having a variety of dimensions. In one embodiment, the tube 200 has a length of 20 feet, a first inside diameter 206a of 0.125 inches, and a wall thickness of 0.125 inches. The dimensions and the material of the tube 200 can provide lateral flexibility. For example, in several embodiments, the tube 200 can be laterally flexible such that it can be laterally displaced at a midpoint of its length by a distance equal to 10% of its length without undergoing permanent deformation. In several embodiments, the mandrel can have a diameter that is approximately 3-4% larger than the first inside diameter 206a, resulting in a second inside diameter 206b of 0.1275 inches to 0.1283 inches. In other embodiments, the tube 200 can have smaller or larger first diameters 206a, second diameters 206b, and/or wall thicknesses. Moreover, the outside diameter and/or the wall ratio can be uniform or mostly uniform throughout the length of the tube 200. For example, in some embodiments the wall ratio does not deviate by more than 15% throughout the length of the tube 200.

Additionally, in several embodiments, multiple mandrels may be used in succession to perform swage autofrettage. For example, a first mandrel with a diameter 1% larger than the first inside diameter 206a may be directed through the tube 200, and subsequent mandrels, each with a diameter 1% larger than the preceding mandrel, may subsequently be directed through the tube 200. In such embodiments, one or more mandrels may be used to expand the bore of the tube 200 to corresponding intermediate inside diameters. Subsequently, a final mandrel can be used to expand the bore to a final inside diameter.

Several embodiments configured in accordance with the present technology can include mandrels having diameters that are less than 1% greater than the first diameter 206a or more than 4% greater than the first diameter 206a. For example, in some embodiments, a mandrel having a maximum outside diameter that is approximately equal to the inside diameter of the tube (e.g., less than 0.25% larger) may be used to clean the inner surface of the tube 200.

Figure 3:
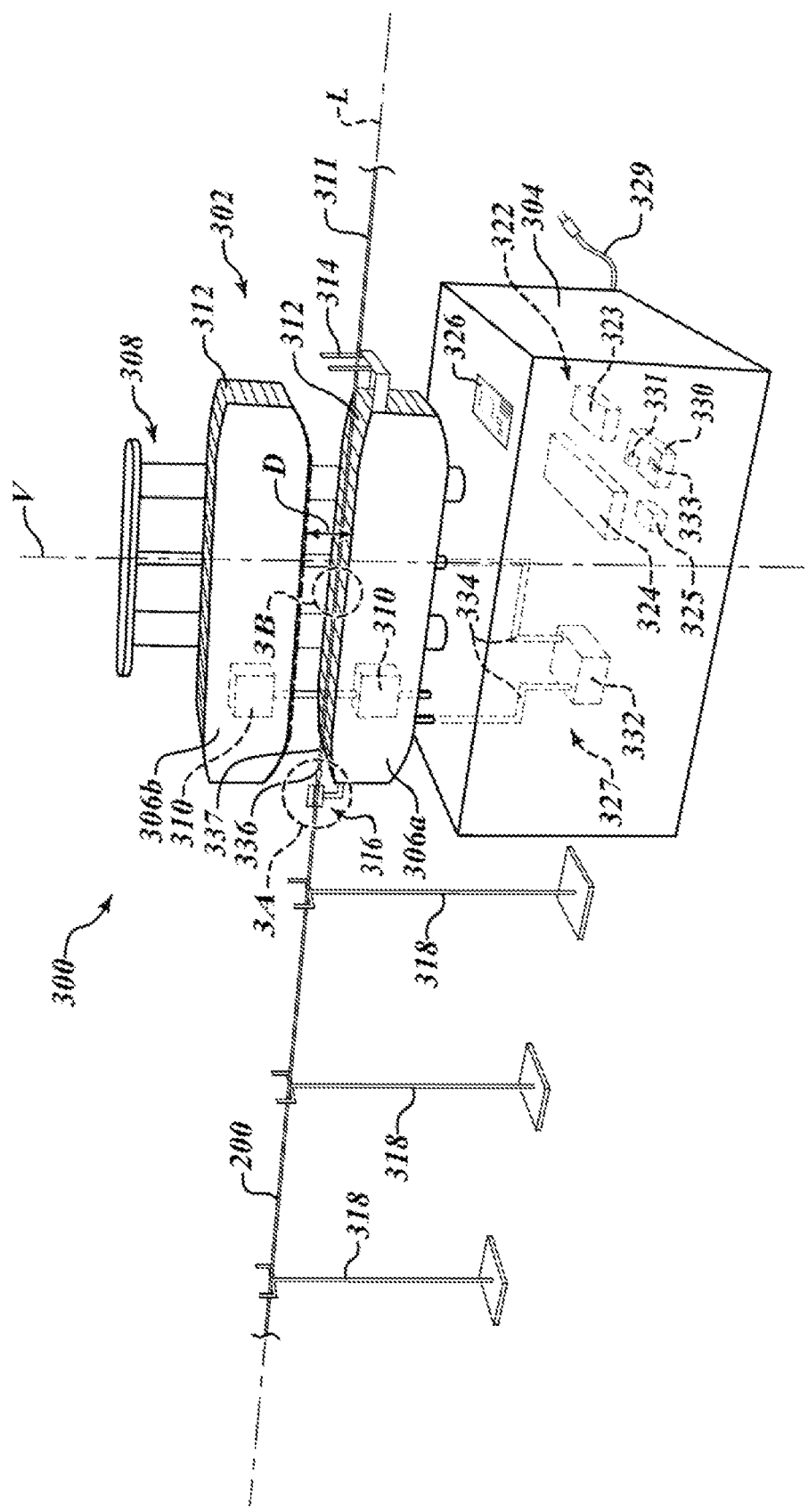
FIG. 3 is a partially schematic, isometric view of a system configured in accordance with an embodiment of the disclosure for producing ultrahigh pressure tubes.
Figure 3B:
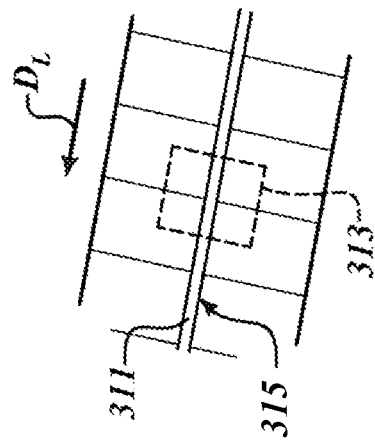
FIGS. 3A and 3B are detail views of portions of FIG. 3.
Figure 3A:
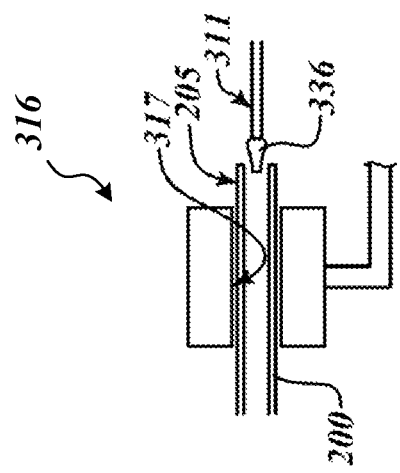

FIG. 3 is a partially schematic, isometric view of a system 300 configured in accordance with an embodiment of the disclosure for producing ultrahigh pressure tubes. FIGS. 3A and 3B are detail views of portions of FIG. 3. Referring to FIGS. 3, 3A and 3B, together, the system 300 includes a first gripper 316 and a second gripper 302. The first gripper 316 can be fixedly attached to the second gripper 302 to secure the tube 200 in a fixed position with respect to the second gripper 302. Specifically, the first gripper 316 includes a first gripping surface 317 (FIG. 3A) that can contact the side surface 205 of the tube 200 to releasably secure the tube 200. Although shown schematically in the illustrated embodiment, the first gripper 316 can be a hydraulically operated gripping mechanism. In some embodiments, the first gripper 316 can be operated via other automatic methods (e.g., pneumatic, electromechanical, etc.), or it can be manually operated (e.g., via gears, threads or other mechanical components).

The second gripper 302 includes a base 304, a first track assembly 306a and a second track assembly 306b (collectively the track assemblies 306). The track assemblies 306 are operably coupled to the base 304 via a press 308 and drive motors 310. The press 308 can include gears or hydraulic components that can move one or both of the track assemblies 306 along a vertical axis V. In particular, the press 308 can move the track assemblies 306 towards or away from one another to vary a distance D between the track assemblies 306. Additionally, the press 308 can apply significant forces on a pushrod 311 or other object positioned between the track assemblies 306.

The track assemblies 306 include treads 312 that are operably coupled to the drive motors 310 via an internal drive mechanism (not visible in FIG. 3), and the drive motors 310 can drive the treads 312 in rotating loops. For example, the tread 312 on the first track assembly 306a can be driven to rotate in a counter-clockwise direction, while the tread 312 on the second track assembly 306b can be driven to rotate in a clockwise direction. The treads or belts 312 include a second gripping surface 313 (FIG. 3B) on an outwardly facing surface that can contact a side surface 315 of the pushrod 311. Although the illustrated embodiment of FIG. 3 includes the treads 312, in other embodiments the track assemblies 306 may include belts, tracks and/or other components that can be driven to rotate. As described further below, the rotating treads 312 can drive the pushrod 311 (or another component) laterally through the second gripper 302. The system 300 also includes a plurality of stands 318 and a guide 314. The stands 318 can support the tube 200 and the guide 314 can align and guide the pushrod 311.

The system 300 can include a control portion 322 having a controller 324 and a control panel 326. The controller 324 can be operably coupled to a power source via, e.g., a power cord 329. The control portion 322 can include a variety of electrical, mechanical and/or electromechanical components, and these components can be used to operate the second gripper 302 and the first gripper 316. For example, the control portion 322 and/or the controller 324 can include one or more programmable logic controllers (PLCs) 323, relays 325, integrated circuits 330, processors 331 and computer readable media or memory 333 (e.g., flash memory, solid state drives, hard drives, other types of ROM or RAM, etc.). The memory 333 can contain software or computer code for operation of the system 300. The control portion 322 can also include a hydraulic system 327 that is operably coupled to the press 308, the first gripper 316 and the controller 324. The hydraulic system 327 can include a pump 332 and control lines 334. The controller 324 can control operation of the pump 332 to provide pressurized hydraulic fluid to the press 308 and to the first gripper 316 via the control lines 334. Additionally, the controller 324 can be electrically coupled to the drive motors 310 to provide signals for operation of the track assemblies 306.

In operation, the system 300 can perform swage autofrettage on tubes or other components, including tubes having relatively long lengths. For example, the tube 200 can be placed on the stands 318 with an end of the tube 200 positioned at least partially within the first gripper 316. An operator can subsequently operate the control panel 326 to actuate the first gripper 316 and releasably secure the tube 200 relative to the second gripper 302. A mandrel 336 having a maximum diameter that is greater than or equal to the first diameter 206a can be positioned at least partially within the bore of the tube 200 and proximate to the first gripper 316. The pushrod 311 can be positioned on the first track assembly 306a and aligned with the mandrel 336 and the bore. The operator can then actuate the press 308 via the control panel 326 to move the second track assembly 306b toward the first track assembly 306a to operably engage the pushrod 311 between the track assemblies 306. For ease of illustration, the mandrel 336 and other components have not been drawn to scale. Specifically, in the illustrated embodiment of FIG. 3 (and in several subsequent Figures), the mandrel 336 is drawn larger to more clearly illustrate the positioning and/or features of the mandrel 336. In some embodiments, the mandrel 336 can have a diameter that is 2% greater than the inside diameter of the tube 200. In other embodiments, the mandrel 336 can have other dimensions.

With the tube 200 secured by the first gripper 316, the operator can actuate one or both of the track assemblies 306. That is, the operator can drive the first track assembly 306a and/or the second track assembly 306b to rotate one or both of the treads 312. The treads 312 advance the second gripping surface 313 along a longitudinal axis L and in a direction $D_L$ toward the tube 200. The gripping surface 313 acts on the side surface 315 of the pushrod 311 to drive the pushrod 311 in the direction $D_L$ such that a distal end 337 of the pushrod 311 exerts significant force on the mandrel 336 and forces the mandrel 336 into the bore. As the track assemblies 306 continue to rotate the treads 312, the mandrel 336 is driven distally (i.e., away from the track assemblies) and further into the tube 200, and the pushrod 311 enters the bore.

In several embodiments, the pushrod 311 can have a diameter that is similar to the inside diameter of the tube 200. For example, the pushrod 311 can have a diameter that is larger than the inside diameter of the tube 200 prior to swage autofrettage, but slightly smaller than the inside diameter of the tube 200 after swage autofrettage. Hence, the pushrod 311 can fit nearly flush within the bore of the tube 200, and the wall of the tube 200 can at least partially support the pushrod 311 as the distal end 337 is pushed into and through the bore. The support provided by the tube 200 can reduce the likelihood of damage to the pushrod 311. For example, absent the relatively tight fit of the pushrod 311 within the bore, the pushrod 311 can be susceptible to bending or buckling from the force required to push the mandrel 336 through the tube 200. Nevertheless, in some embodiments, the pushrod 311 can have a smaller diameter, including a diameter smaller than the inside diameter of the tube 200 prior to swage autofrettage. Even in embodiments having smaller diameter pushrods, the tube 200 can provide support for the pushrod during swage autofrettage via the system 300. Notably, the pushrod 311 can have a length that is longer than the tube 200, and as the distal end 337 of the pushrod is driven through the tube 200, the tube 200 can provide support for each incremental portion of the pushrod 311 that enters the tube 200.

A variety of additional steps or procedures can be included in the swage autofrettage process described above with respect to the system 300. For example, in several embodiments, preparation of the tube 200 can be included as part of the swage autofrettage process. In several embodiments, a cone can be formed in the bore of the tube 200 to receive the mandrel 336. The cone can extend at least partially into the bore to receive and support at least a portion of the mandrel 336 prior to the mandrel being pushed through the bore. The cone can be formed in the tube 200 via a variety of suitable machine tools (e.g., boring via a router or drill). After the formation of the cone, the tube 200 can be cleaned prior to inserting the mandrel in the bore. Additionally, lubricant(s) (e.g., mandrelizing grease) can be used to facilitate the passage of the mandrel 336 through the bore during the swage autofrettage process.

In the illustrated embodiment of FIG. 3, the first track assembly 306a and the second track assembly 306b are both coupled to the press 308. In other embodiments, only one of the track assemblies 306 may be coupled to the press 308. For example, the first track assembly 306a may be operably coupled to one of the drive motors 310 and fixedly attached to the base 304 via a mount (not shown).

The systems and methods described herein can be tailored to provide a desired increase in fatigue life and/or a desired increase in elastic strength. In several embodiments, the primary objective is to increase fatigue life. In such embodiments, the size of the mandrel 336, the speed of the gripping surface 313, and/or other factors can be used to subject the tube 200 to a desired pressure or overstrain during the autofrettage process. The desired pressure can be selected to reduce the maximum shear stresses per the Tresca criterion. In other embodiments, similar factors may be selected to produce a higher pressure or overstrain and provide greater elastic strength subsequent to the autofrettage process. The desired pressure or overstrain generated during the autofrettage process can be dependent upon the operating pressure that the tube will be subjected to, the wall ratio of the tube, and the yield strength of the material.

Figure 4:
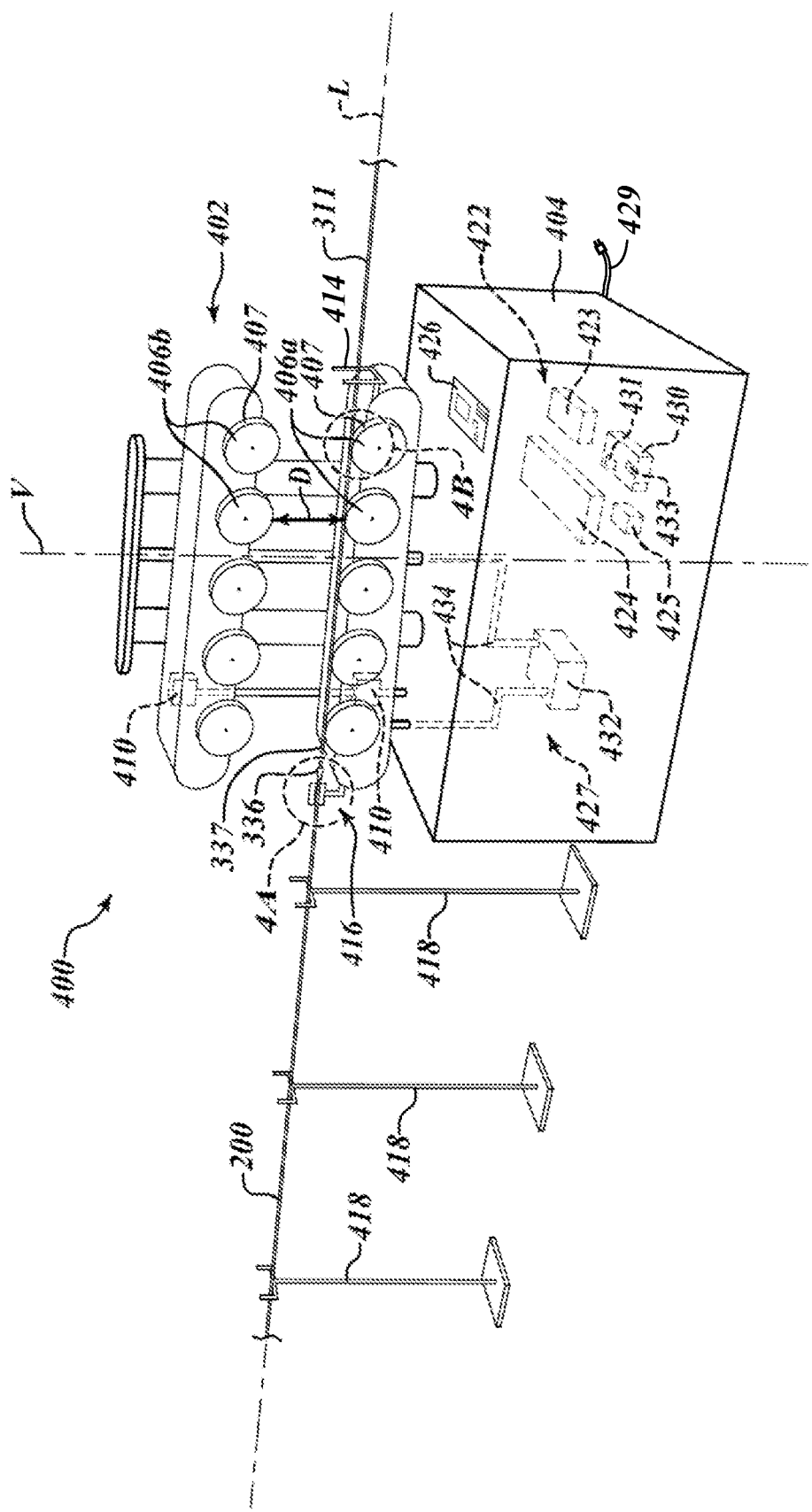
FIG. 4 is a partially schematic, isometric view of a system configured in accordance with another embodiment of the disclosure for producing ultrahigh pressure tubes.
Figure 4B:
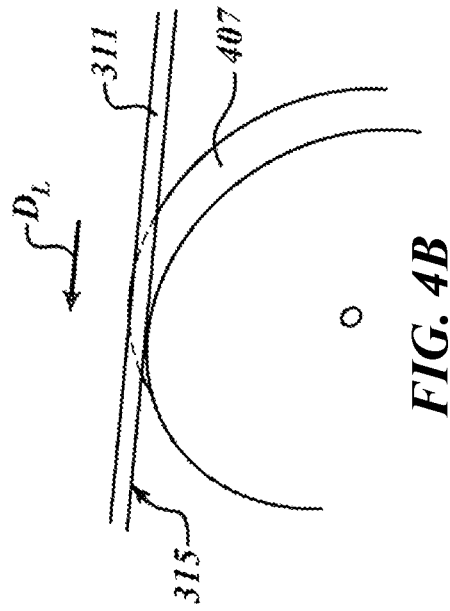
FIGS. 4A and 4B are detail views of portions of FIG. 4.
Figure 4A:
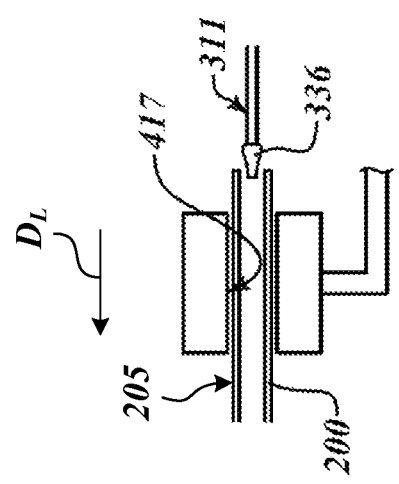

FIG. 4 is a partially schematic, isometric view of a system 400 configured in accordance with an embodiment of the disclosure for producing ultrahigh pressure tubes. FIGS. 4A and 4B are detail views of portions of FIG. 4. Similar to the system 300, the system 400 includes a first gripper 416 and a second gripper 402 having a base 404. Referring to FIGS. 4, 4A and 4B, together, the first gripper 416 includes a first gripping surface 417 (FIG. 4A) that can contact the side surface 205 of the tube 200 to releasably secure the tube 200. The second gripper 402 includes a first plurality of rollers or first set of rollers 406a and a second plurality of rollers or second set of rollers 406b (collectively the rollers 406 or sets of rollers 406). The rollers 406 are operably coupled to the base 404 via a press 408 and drive motors 410. The rollers 406 include a second gripping surface 407 on an outwardly facing surface of the rollers 406. The press 408 can be substantially similar to the press 308, and can include gears or hydraulic components that can move one or both sets of rollers 406 along a vertical axis V. In particular, the press 408 can move the sets of rollers 406 towards or away from one another to vary a distance D between the sets of rollers 406. The press 408 can also apply significant forces on the pushrod 311 or other object positioned between the rollers 406.

The rollers 406 can be made from metal or metal alloys (e.g., steel), or from a variety of other materials. In several embodiments, the second gripping surface 407 is shaped to align with the pushrod 311. For example, in one embodiment, the second gripping surface 407 can be concave and can include a radius of curvature that is shaped to be slightly larger than the radius of the pushrod 311. In other embodiments, the curvature can be equal to or less than the radius of curvature of the pushrod 311. Shaping the second gripping surface 407 to align with the pushrod 311 can reduce the possibility of slippage when the pushrod 311 is driven by the rollers 406 (as described further below), and it can help to maintain the pushrod 311 in alignment with the tube 200.

The rollers 406 can be operably coupled to the drive motors 410 via an internal drive mechanism (e.g., one or more gears, sprockets, chains or other drive components), and the drive motors 410 can rotate the rollers 406. For example, the first set of rollers 406a can be rotated in a counter-clockwise direction, while the second set of rollers 406b can be rotated in a clockwise direction. As described further below, the rotating rollers 406 can drive the pushrod 311 (or another component) along a longitudinal axis L through the second gripper 402.

The system 400 can include several additional components that are substantially similar to the components of the system 300. For example, the system 400 can include a guide 414, a plurality of stands 418, a control portion 422, a controller 424, a control panel 426 and a power cord 429. Additionally, the control portion 422 and/or the controller 424 can include Programmable Logic Controller(s) (PLC) 423, relays 425, integrated circuits 430, processors 431 and computer readable media or memory 433; and the control portion 422 can also include a hydraulic system 427 having a pump 432 and control lines 434.

In operation, the system 400 can perform swage autofrettage in a manner similar to the system 300. For example, the tube 200 can be placed on the stands 418 and secured via the first gripper 416. The pushrod 311 can be positioned on the first set of rollers 406 and aligned with the mandrel 336 and the bore. The operator can actuate the press 408, engage the pushrod 311 between the rollers 406, and then actuate rotation of the rollers 406 to move at least a portion of the second gripping surface 407 in a direction $D_L$ toward the tube 200. Movement of the second gripping surface 407 toward the tube 200 drives the pushrod 311 toward the tube 200, forcing the mandrel 336 into and through the tube 200.

Figure 5:
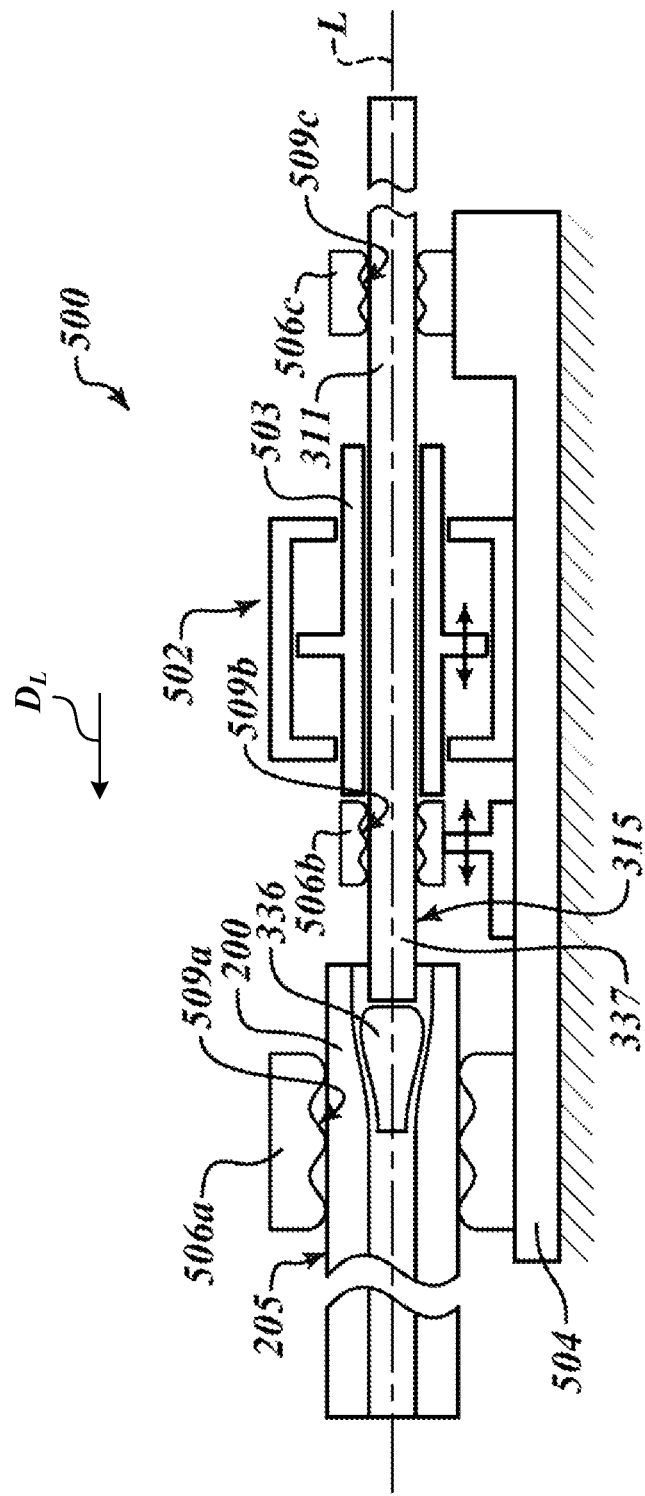
FIG. 5 is a partially schematic, cross sectional view of a system configured in accordance with yet another embodiment of the disclosure for producing ultrahigh pressure tubes.

FIG. 5 is a partially schematic, cross sectional view of a system 500 configured in accordance with an embodiment of the disclosure for producing ultrahigh pressure tubes. In the illustrated embodiment, the system 500 includes a pusher 502 mounted to a base 504. The pusher 502 can be hydraulically actuated and include a double acting, hollow plunger cylinder 503. In some embodiments, the pusher 502 can be a hollow plunger cylinder manufactured by Enerpac, of Menomonee Falls, Wis., and having a model number of RRH-307. As described in more detail below, the pusher 502 can push or advance the pushrod 311 to drive the mandrel 336 through the tube 200. Several components in FIG. 5 are not drawn to scale. For example, the dimensions of the mandrel 336 and the tube 200 are exaggerated to better illustrate swage autofrettage via the system 500. Specifically, the diameter of the mandrel 336 is shown as significantly larger than the inside diameter of the tube 200 to better illustrate the swage autofrettage process. In several embodiments, the mandrel 336 includes a diameter that is closer to that of the inside diameter of the tube, and the deformation of the tube is significantly less than that shown in FIG. 5.

The system 500 can also include a plurality of clamps or grippers 506 (identified individually as a first gripper 506a, a second gripper 506b and a third gripper 506c). The clamps or grippers 506 can be similar to the first grippers 316 and 416 described above with respect to the systems 300 and 400, and can be used to releasably secure the tube 200 and the pushrod 311. The term "gripper," as used herein, can refer to any device, system, component or assembly that contacts a tube or a pushrod to secure or advance the tube or pushrod. For example, the term first gripper can refer to the first grippers 316 and 416, the second grippers 302 and 402, the track assemblies 306, the treads 312, the rollers 406, the pusher 502 and/or the clamps or grippers 506.

The first gripper 506a includes a first gripping surface 509a, the second gripper 506b includes a second gripping surface 509b, and the third gripper 506c includes a third gripping surface 509c. The first gripper 506a and the third gripper 506c are operably coupled to the base 504, and the second gripper 506b is slidably coupled to the base 504. Although not shown in FIG. 5, the system 500 can include a control portion and associated components to operate the pusher 502 and the grippers 506. For example, the system 500 can include a hydraulic pump, control lines, a controller, a control panel, PLCs, relays, processors, integrated circuits, memory, and/or other components to control the operation of the pusher 502 and the grippers 506.

In operation, the system 500 can perform swage autofrettage on the tube 200 via alternating activation of the grippers 506 and the pusher 502. For example, the first gripper 506a can be activated to engage the first gripping surface 509a with the side surface 205 of the tube 200 to releasably secure the tube 200. The second gripper 506b can be activated to engage the second gripping surface 509b with the side surface 315 of the pushrod 311 to slidably secure the pushrod 311. Subsequently, pressurized hydraulic fluid can be directed to the pusher 502 to drive the hollow cylinder 503 against the second gripper 506b. The force from the cylinder 503 drives the second gripper 506b and the second gripping surface 509b in a direction $D_L$ along a longitudinal axis L and toward the tube 200. The second gripping surface 509b drives the pushrod 311 in the direction DL, forcing the mandrel 336 into the tube 200. The hydraulic fluid continues to drive the cylinder 503 toward the tube 200 until the cylinder reaches the end of its stroke. The third gripper 506c is then activated to engage the third gripping surface 509c with the side surface 315 of the pushrod 311 to secure the pushrod 311; and the second gripper 506b is deactivated or released. The cylinder 503 and the second gripper 506b are returned to their initial position at the back of the stroke, and the second gripper 506b is then reactivated to secure the pushrod 311. In some embodiments, the second gripper 506b can be returned to the initial position via a spring or other automatic return mechanism. With the second gripper 506b in its initial position and securing the pushrod 311, the third gripper 506c is deactivated. Hydraulic fluid is then directed to the pusher 502 to initiate another stroke of the cylinder 503 and force the mandrel 336 further into the tube 200. This process is then repeated until the mandrel is driven through the tube 200.

Figure 6:
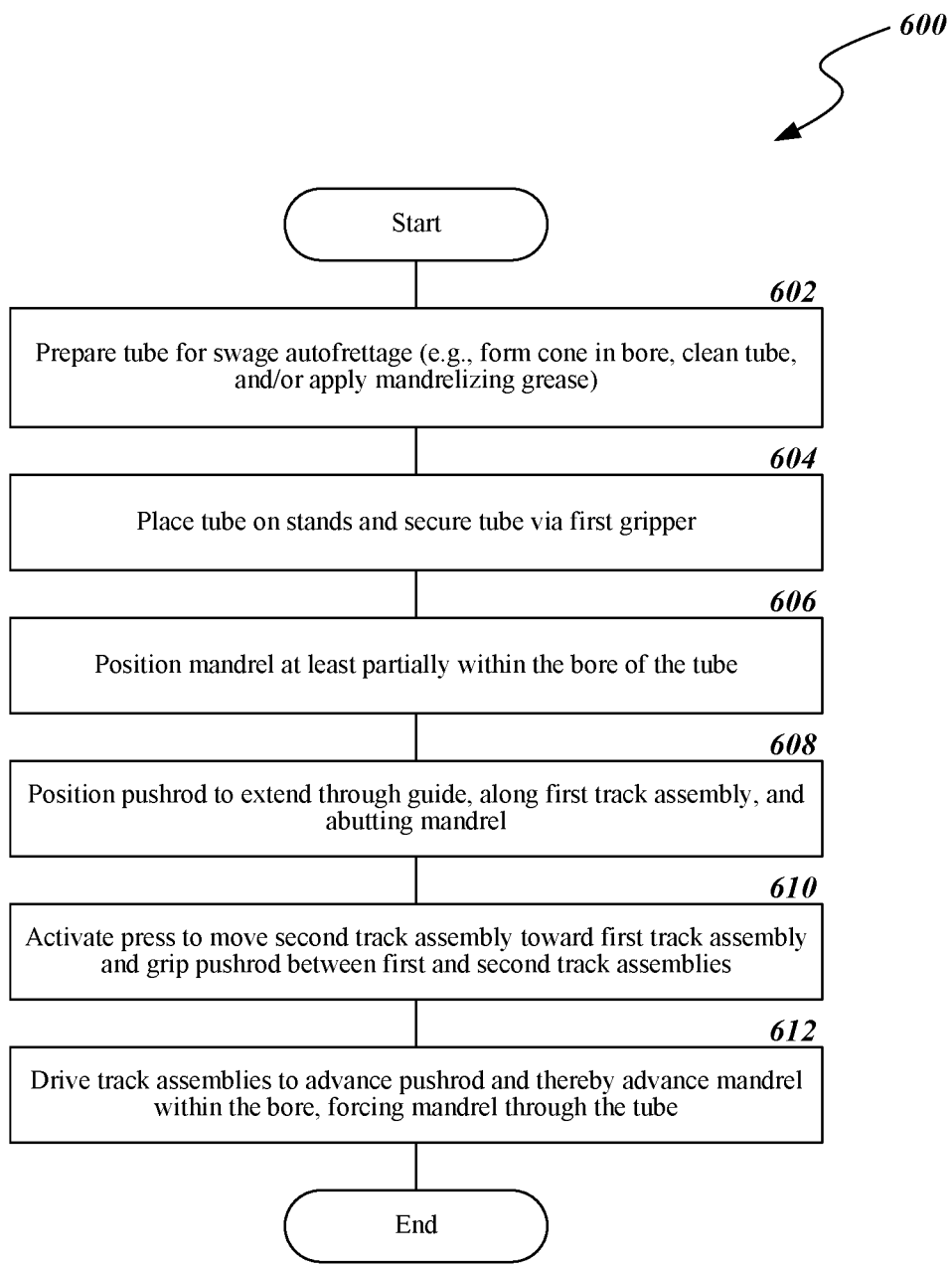
FIG. 6 is a flow diagram of a method for performing swage autofrettage of tubes in accordance with an embodiment of the disclosure.

The systems 300, 400 and 500 can perform swage autofrettage to enhance the fatigue resistance of tubes via a variety of methods. FIG. 6 is a flow diagram of a method 600 for performing swage autofrettage of the tube 200 via the system 300 and in accordance with an embodiment of the disclosure. The method 600 begins at step 602, where the tube 200 is prepared for swage autofrettage. The tube preparation can include formation of a cone in the bore, cleaning of the tube 200, and the application of mandrelizing grease to the bore of the tube 200. At step 604, the tube 200 is placed on the stands 318 and secured via the first gripper 316. At step 606, the mandrel 336 is positioned at least partially within the bore of the tube 200 (e.g., at least partially within a cone formed in the bore). At step 608, the pushrod 311 is positioned to extend through the guide 314 and along the first track assembly 306a, abutting the mandrel 336. At step 610, the press 308 is activated to move the second track assembly 306b toward the first track assembly 306a and grip the pushrod 311 therebetween. At step 612, the track assemblies 306 are driven to rotate the treads 312 and advance the pushrod 311 against the mandrel 336, thereby advancing the mandrel 336 longitudinally within the bore and forcing the mandrel 336 through the tube 200. After step 612, the method 600 concludes.

Figure 7:
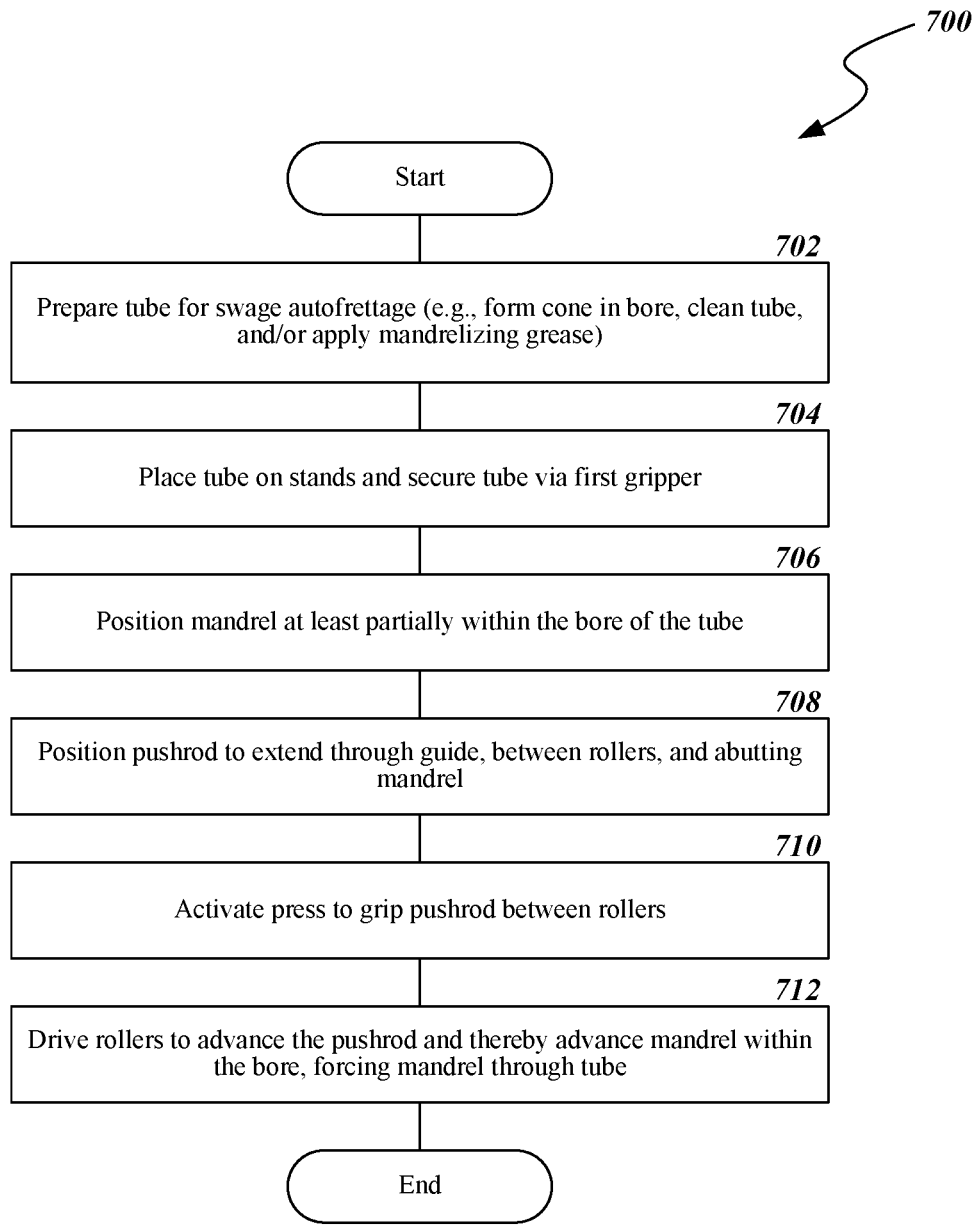
FIG. 7 is a flow diagram of a method for performing swage autofrettage of tubes in accordance with another embodiment of the disclosure.

FIG. 7 is a flow diagram of a method 700 for performing swage autofrettage of the tube 200 via the system 400 and in accordance with an embodiment of the disclosure. The method 700 can include several steps that are at least similar to the method 600. For example, the method 700 begins at step 702, where the tube 200 is prepared for swage autofrettage. Similar to step 602 of the method 600, the tube preparation of step 702 can include formation of a cone in the bore, cleaning of the tube 200, and the application of mandrelizing grease to the bore of the tube 200. At step 704, the tube 200 is placed on the stands 418 and secured via the first gripper 416. At step 706, the mandrel 336 is positioned at least partially within the bore of the tube 200. At step 708, the pushrod 311 is positioned to extend through the guide and between the rollers 406, abutting the mandrel 336. At step 710, the press 408 is activated to grip the pushrod 311 between the rollers 406. At step 712, the rollers 406 are driven to rotate and advance the pushrod 311 against the mandrel 336, thereby advancing the mandrel 336 longitudinally within the bore and forcing the mandrel 336 through the tube 200. After step 712, the method 700 concludes.

Figure 8:
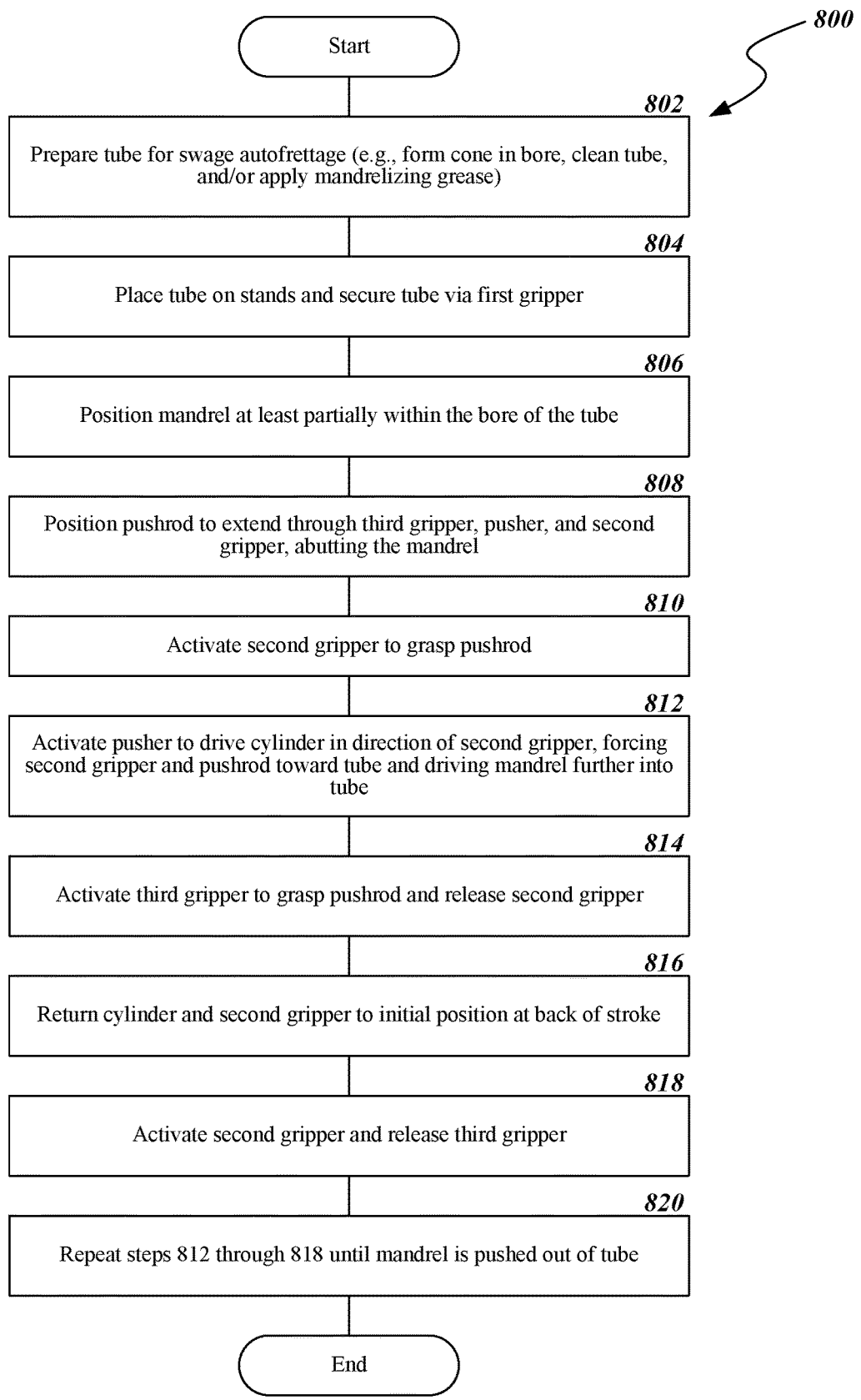
FIG. 8 is a flow diagram of a method for performing swage autofrettage of tubes in accordance with yet another embodiment of the disclosure.

FIG. 8 is a flow diagram of a method 800 for performing swage autofrettage of the tube 200 via the system 500 and in accordance with an embodiment of the disclosure. Method 800 begins at step 802, where the tube 200 is prepared for swage autofrettage. Similar to steps 602 and 702, the tube preparation of step 802 can include formation of a cone in the bore, cleaning of the tube 200, and the application of mandrelizing grease to the bore of the tube 200. At step 804, the tube 200 can be placed on stands and secured via the first gripper 506a. At step 806, the mandrel 336 is positioned at least partially within the bore of the tube 200. At step 808, the pushrod 311 is positioned to extend through the third gripper 506c, the pusher 502, and the second gripper 506b, abutting the mandrel 336. At step 810, the second gripper 506b is activated to grasp the pushrod 311. At step 812 the pusher is activated to drive the cylinder 503 in the direction of the second gripper 506b, forcing the second gripper 506b and the pushrod 311 toward the tube 200 and driving the mandrel 336 further into the bore of the tube 200. At step 814, the third gripper 506c is activated to grasp the pushrod 311, and the second gripper 506b is released. At step 816, the cylinder 503 and the second gripper 506b are returned to their initial position at the back of the stroke. At step 818, the second gripper 506b is activated, and the third gripper 506c is released. At step 820, steps 812 through 818 are repeated until the mandrel 336 is pushed out the end of the tube 200. After step 820, the method 800 concludes.

In addition to the methods 600, 700 and 800 for performing swage autofrettage, the disclosed technology includes a variety of other methods for performing swage autofrettage. For example, the systems 300, 400 and 500 can be used to secure a pushrod while a tube is advanced over a mandrel positioned at the end of the pushrod. In one method, the pushrod 311 is positioned on the stands 318 and secured via the first gripper 316. The tube 200 is positioned to extend through the guide 314 and along the first track assembly 306a. The press 308 is then activated to move the second track assembly 306b toward the first track assembly 306a and grip the tube 200 therebetween. The mandrel 336 can be positioned at least partially within the tube 200 and adjacent the pushrod 311. The track assemblies 306 are then driven to rotate the treads 312 and advance the tube 200 toward the pushrod 311, thereby advancing the mandrel 336 longitudinally within the bore and forcing the mandrel 336 through the tube 200. Additionally, in some embodiments multiple sets of track assemblies or rollers may be used to simultaneously advance a pushrod toward a tube and advance the tube toward the pushrod.

Although the systems and methods described above include a variety of grippers that can secure tubes for swage autofrettage, the systems and methods of the present technology can include the use of a variety of other devices or components that can secure tubes for swage autofrettage. For example, in several embodiments a gripper can include a threaded receiver. In such embodiments, the tube 200 can include external threads that can engage with internal threads in the threaded receiver. In operation, the tube 200 can be rotated to releasably engage with the threaded receiver, and the threaded receiver can secure the tube 200 in a fixed position during swage autofrettage.

Figure 9:
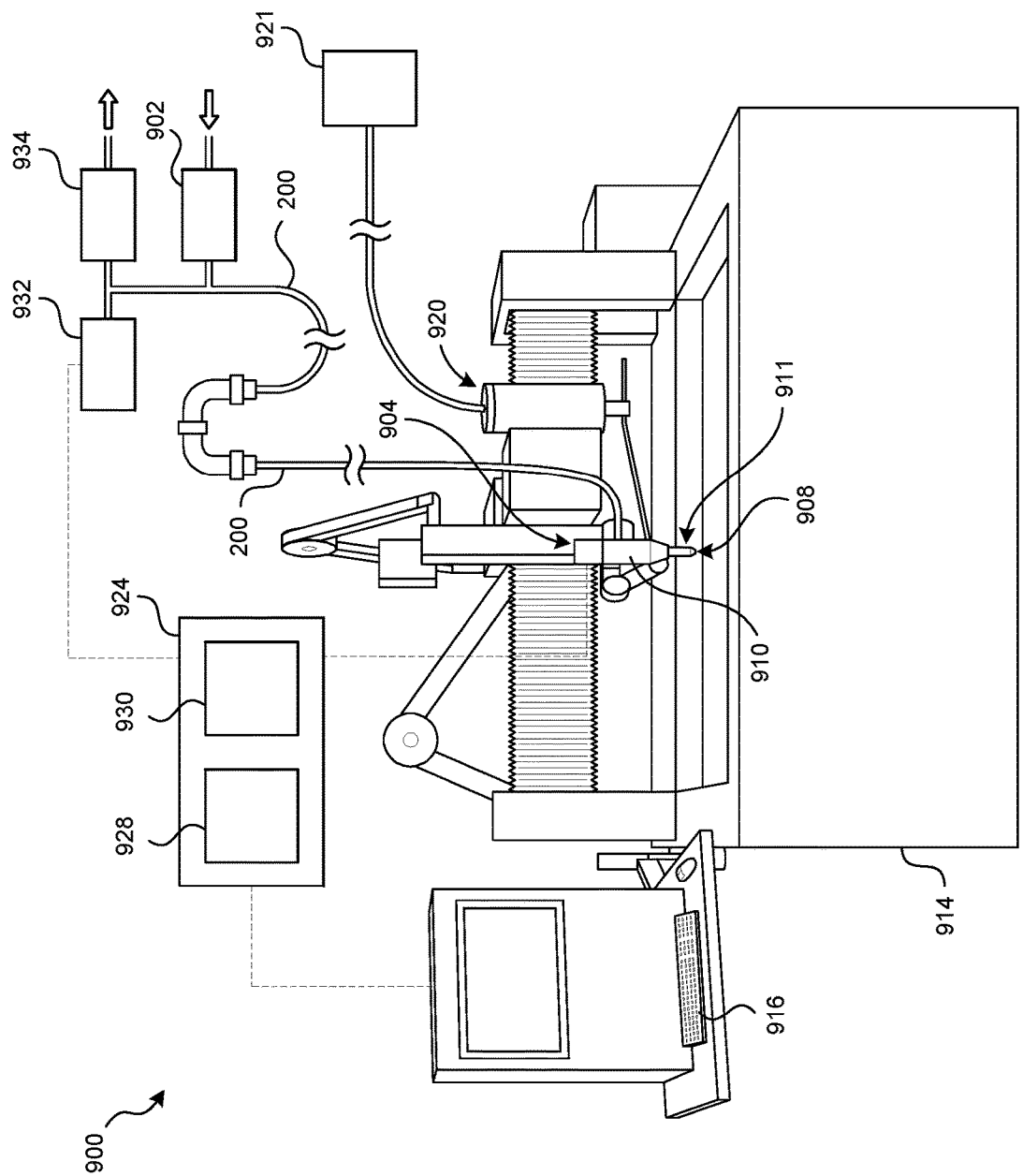
FIG. 9 is a perspective view of a waterjet system having tubes configured in accordance with an embodiment of the disclosure.

FIG. 9 is a perspective view of a waterjet system 900 having tubes 200 configured in accordance with an embodiment of the disclosure. The waterjet system 900 includes a fluid-pressurizing device 902 (shown schematically) configured to pressurize a process fluid (e.g., water) to a pressure suitable for waterjet processing. In some embodiments, the fluid-pressurizing device 902 can include a multiplex pump system that is at least generally similar to pump systems described in U.S. patent application Ser. No. 14/624,374, filed Feb. 17, 2015, and entitled "MULTIPLEX PUMP SYSTEMS AND ASSOCIATED METHODS OF USE WITH WATERJET SYSTEMS AND OTHER HIGH PRESSURE FLUID SYSTEMS," the entirety of which is incorporated by reference herein. The waterjet system 900 can further include a waterjet assembly 904 operably connected to the fluid-pressurizing device 902 via one or more tubes 200 extending between the fluid pressurizing device 902 and the waterjet assembly 904. In the illustrated embodiment, the tubes 200 are also connected in fluid communication to a safety valve 932 and a relief valve 934.

The waterjet assembly 904 can include a cutting head 911 downstream from the pressurizing device 902 and having a jet outlet 908 and a control valve 910. The waterjet system 900 can further include a user interface 916 supported by a base 914, and an abrasive-delivery apparatus 920 configured to feed particulate abrasive material from an abrasive material source 921 to the waterjet assembly 904. The system 900 can also include a controller 924 (shown schematically) that is operably connected to a user interface 916. The controller 924 can include a processor 928 and memory 930 and can be programmed with instructions (e.g., non-transitory instructions contained on a computer-readable medium) that, when executed, control operation of the system 900. In operation, the system 900 can perform cutting operations via a waterjet formed via ultrahigh pressure liquid delivered by the tubes 200. The increased fatigue life of the tubes 200 (as described above) can significantly improve the performance of the system 900 by enabling additional pressurization cycles, reducing maintenance requirements, and reducing operational costs.

Systems and devices configured in accordance with the present disclosure can provide several advantages over prior systems for performing autofrettage. For example, the systems 300, 400 and 500, can perform swage autofrettage on components that would be too long for traditional swage autofrettage, and that would only be amenable to hydraulic autofrettage. Specifically, prior systems for swage autofrettage utilize hydraulic presses or other components that push on a pushrod at an end of the pushrod that is opposite to the end that exerts a force on a mandrel. Accordingly, in these prior systems, the full length of the pushrod is under compressive stress and unsupported prior to entering the component. In contrast to these devices, the track assemblies 306, the rollers 406 and the pusher 502 drive a pushrod from a position adjacent to the tube 200, thereby reducing the portion of the pushrod that is both subject to compressive stress and unsupported by the tube 200. In several embodiments, for example, the first grippers 316 and 416 can be positioned less than 6 inches from the tracks 312 or the rollers 406. Similarly, the first gripper 506a can be positioned less than 6 inches from the pusher 512. Accordingly, the unsupported position of the pushrod can be less than 6 inches. In other embodiments, the distances between the gripping assemblies and the tracks or rollers (or between the first gripper and the pusher) can be greater than or less than 6 inches. Importantly though, the systems disclosed herein can reduce the unsupported portion of the pushrod, independent of the pushrod's length. Accordingly, the disclosed systems and methods can perform swage autofrettage on components of significantly longer lengths.

In the embodiment of FIG. 5, a distal portion 337 of the pushrod 311 is positioned adjacent the third gripper 506c and the second gripper 506b, while a proximal portion of the tube 200 is positioned adjacent the first gripper 506a. In several embodiments, the third gripper 506c and the second gripper 506b can be positioned to engage the pushrod 311 within a distalmost third portion of the pushrod 311, and the first gripper 506a can be positioned to engage the tube 200 within a proximalmost third portion of the tube 200.

In addition to reducing the compressive loads on pushrods, the continuous feeding of pushrods by the track assemblies 306, the rollers 406 and the pusher 502 provides for the use of tubes and pushrods having significantly longer lengths. That is, prior systems utilizing hydraulic presses or other devices do not have a stroke that is long enough to push a mandrel through long tubes, and therefore require the use of one or more additional push rods. The continuous feeding of pushrods provided by the systems disclosed herein overcome this limitation.

Furthermore, the systems 300 and 400 can perform swage autofrettage on long tubes or other components in an uninterrupted manner. That is, the systems 300 and 400 can drive a mandrel through a long tube at a constant speed. In some embodiments, the constant speed can reduce variations in the residual stresses that are induced in the tubes, thereby producing more uniform and stronger tubes. Additionally, in some embodiments, the speed can be controlled to enhance the effects of the autofrettage. For example, tubes having different alloy compositions or different dimensions may benefit from particular speeds.

As discussed above, in some embodiments, the control panels 326 may be used to activate several components to perform the swage autofrettage. For example, in some embodiments, an operator can utilize the control panels of the systems 300, 400 and 500 to perform one or more steps of the methods 600, 700 and 800, respectively.

Furthermore, embodiments configured in accordance with the present disclosure can include additional components or devices to fully automate the swage autofrettage of tubes. In one example, conveyors, robotic arms and/or other assembly line or manufacturing devices may be used to sequentially load tubes, mandrels, pushrods, or other components and automatically push one or more mandrels through a series of tubes.

From the foregoing, it will be appreciated that specific embodiments have been described herein for purposes of illustration, but that various modifications may be made without deviating from the spirit and scope of the present disclosure. Those skilled in the art will recognize that numerous modifications or alterations can be made to the components or systems disclosed herein. For example, in several embodiments, rather than utilizing a mandrel separate from a pushrod, a mandrel can be an integral part of a pushrod. Moreover, certain aspects of the present disclosure described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present disclosure. Accordingly, the inventions are not limited except as by the appended claims.

We claim:

1. A method of performing swage autofrettage on a pressure vessel, the pressure vessel consisting of a single-piece elongate metal tube, the method comprising:
   longitudinally aligning an elongate pushrod, a mandrel, and the single-piece elongate metal tube having a longitudinal bore and an annular wall extending around the bore, wherein a ratio of a length of the elongate metal tube to an inside diameter of the elongate metal tube is at least 90, and wherein the mandrel is either separate from the pushrod or part of the pushrod;
   gripping a portion of a side surface of the tube;
   gripping a portion of a side surface of the pushrod; and
   decreasing a distance between the portion of the side surface of the tube and the portion of the side surface of the pushrod to advance the mandrel distally within the bore, thereby
      expanding an inner diameter of the bore without expanding an outer diameter of the tube,
      inducing residual longitudinal and tangential compressive stress at an inner portion of the wall, and
      inducing residual longitudinal and tangential tensile stress at an outer portion of the wall.

2. The method of claim 1 wherein decreasing the distance between the portion of the side surface of the tube and the portion of the side surface of the pushrod includes applying traction to the side surface of the pushrod to feed the pushrod into the bore.

3. The method of claim 1 wherein decreasing the distance between the portion of the side surface of the tube and the portion of the side surface of the pushrod includes applying traction to the side surface of the tube to feed the tube over the pushrod.

4. The method of claim 1 wherein decreasing the distance between the portion of the side surface of the tube and the portion of the side surface of the pushrod includes simultaneously applying traction to the side surface of the tube and applying traction to the side surface of the pushrod to simultaneously feed the pushrod into the bore and feed the tube over the pushrod.

5. The method of claim 1 wherein:
   gripping the portion of the side surface of the pushrod includes contacting an outwardly facing surface of a belt and the portion of the side surface of the tube; and
   gripping the portion of the side surface of the pushrod while moving the belt along a looped path decreases the distance between the portion of the side surface of the tube and the portion of the side surface of the pushrod.

6. The method of claim 1 wherein:
gripping the portion of the side surface of the pushrod includes contacting an outwardly facing surface of a roller and the portion of the side surface of the tube; and
gripping the portion of the side surface of the pushrod while rotating the roller decreases the distance between the portion of the side surface of the tube and the portion of the side surface of the pushrod.

7. The method of claim 1 wherein gripping the portion of the side surface of the pushrod includes gripping the portion of the side surface of the pushrod at a distalmost third of a length of the pushrod outside the bore.

8. The method of claim 1 wherein:
the bore has an inner diameter less than 0.2 inch; and
decreasing the distance between the portion of the side surface of the tube and the portion of the side surface of the pushrod includes decreasing the distance between the portion of the side surface of the tube and the portion of the side surface of the pushrod by at least three feet.

9. The method of claim 1 wherein:
the bore has an inner diameter less than 0.25 inch; and
decreasing the distance between the portion of the side surface of the tube and the portion of the side surface of the pushrod includes decreasing the distance between the portion of the side surface of the tube and the portion of the side surface of the pushrod by at least five feet.

10. The method of claim 1 wherein gripping the portion of the side surface of the tube includes clamping the portion of the side surface of the tube to secure the tube in a fixed position.

11. A method of performing swage autofrettage on a pressure vessel, the pressure vessel consisting of a single-piece elongate metal tube, the method comprising:
advancing a mandrel distally within a bore of the single-piece elongate tube by at least one of feeding an elongate pushrod into the bore or feeding the tube over the pushrod, wherein the mandrel is either separate from the pushrod or part of the pushrod, and wherein the elongate tube has an aspect ratio of a length of the elongate tube to an inner diameter of the elongate tube of at least 90; and
longitudinally and radially dislocating first metal microstructures at an inner portion of a wall of the tube without longitudinally and radially dislocating second metal microstructures at an outer portion of the wall.

12. The method of claim 1 wherein longitudinally and radially dislocating the first metal microstructures includes longitudinally and radially dislocating the first metal microstructures throughout a full length of the tube.

13. The method of claim 1, further comprising:
inducing residual longitudinal and tangential compressive stress at the inner portion of the wall; and
inducing residual longitudinal and tangential tensile stress at the outer portion of the wall.

14. The method of claim 1, further comprising:
inducing residual longitudinal and tangential compressive stress at the inner portion of the wall substantially uniformly throughout a full length of the tube; and
inducing residual longitudinal and tangential tensile stress at the outer portion of the wall substantially uniformly throughout the full length of the tube.

15. The method of claim 1, further comprising:
gripping a portion of a side surface of the tube; and
gripping a portion of a side surface of the pushrod,
wherein advancing the mandrel distally within the bore includes advancing the mandrel distally within the bore by decreasing a distance between the portion of the side surface of the tube and the portion of the side surface of the pushrod.

16. The method of claim 15 wherein:
gripping the portion of the side surface of the pushrod includes contacting an outwardly facing surface of a belt and the portion of the side surface of the tube; and
decreasing the distance between the portion of the side surface of the tube and the portion of the side surface of the pushrod includes moving the belt along a looped path.

17. The method of claim 15 wherein:
gripping the portion of the side surface of the pushrod includes contacting an outwardly facing surface of a roller and the portion of the side surface of the tube; and
decreasing the distance between the portion of the side surface of the tube and the portion of the side surface of the pushrod includes rotating the roller.

18. The method of claim 15 wherein gripping the portion of the side surface of the pushrod includes gripping the portion of the side surface of the pushrod at a distalmost third portion of the pushrod outside the bore.

19. The method of claim 15 wherein:
the bore has an inner diameter less than 0.2 inch; and
decreasing the distance between the portion of the side surface of the tube and the portion of the side surface of the pushrod includes decreasing the distance between the portion of the side surface of the tube and the portion of the side surface of the pushrod by at least three feet.

20. The method of claim 15 wherein:
the bore has an inner diameter less than 0.25 inch; and
decreasing the distance between the portion of the side surface of the tube and the portion of the side surface of the pushrod includes decreasing the distance between the portion of the side surface of the tube and the portion of the side surface of the pushrod by at least five feet.

21. The method of claim 1 wherein the tube is configured to convey liquid having at pressures from atmosphere up to 60,000 psi.

22. The method of claim 1, wherein the tube is configured to withstand pressurization cycles from atmospheric pressure to 60,000 psi.

23. The method of claim 11 wherein the tube is configured to convey liquid having at pressures from atmosphere up to 60,000 psi.

24. The method of claim 11, wherein the tube is configured to withstand pressurization cycles from atmospheric pressure to 60,000 psi.

* * * * *